United States Patent
Ponson et al.

(10) Patent No.: US 6,179,473 B1
(45) Date of Patent: Jan. 30, 2001

(54) ROLLING BEARING OF STEERING COLUMN FOR MOTOR VEHICLES

(75) Inventors: Frederic Ponson, Luynes; Thierry Poulle, Neuvy-le-Roi; Benoît Arnault, Tours; Bertrand Collignon, Saint-Cyr-sur-Loire; Christophe Houdayer, Tours; Filippo Zingariello, Luynes, all of (FR)

(73) Assignee: SKF France (FR)

( * ) Notice: Under 35 U.S.C. 154(b), the term of this patent shall be extended for 0 days.

(21) Appl. No.: 09/308,758

(22) PCT Filed: Dec. 4, 1997

(86) PCT No.: PCT/FR97/02207
§ 371 Date: May 25, 1999
§ 102(e) Date: May 25, 1999

(87) PCT Pub. No.: WO98/26189
PCT Pub. Date: Jun. 18, 1998

(30) Foreign Application Priority Data

Dec. 9, 1996 (FR) .................................................. 96 15106
Apr. 29, 1997 (FR) .................................................. 97 05259

(51) Int. Cl.[7] .................................................. F16C 43/04
(52) U.S. Cl. .......................... 384/537; 384/517; 384/538; 384/539
(58) Field of Search ..................................... 384/517, 539, 384/538, 537

(56) References Cited

U.S. PATENT DOCUMENTS

| 3,972,574 | 8/1976 | Pitner | 384/621 |
| 5,193,917 | * 3/1993 | Adler et al. | 384/517 |
| 5,538,282 | * 7/1996 | White et al. | 384/517 X |
| 5,826,987 | * 10/1998 | Beaman | 384/517 |

FOREIGN PATENT DOCUMENTS

| 25 07 900 | 8/1975 | (DE) . |
| 38 08 556 | 9/1989 | (DE) . |

* cited by examiner

Primary Examiner—Thomas R. Hannon
(74) Attorney, Agent, or Firm—Smith, Gambrell & Russell, LLP

(57) ABSTRACT

A rolling bearing, in particular for motor vehicle steering column comprising an external ring (4) provided with a bearing raceway, an internal ring (6) provided with a bearing raceway, a row of rolling elements (8) arranged between the bearing raceways of said rings, tolerance ring (9) linking the internal ring with the shaft (3), and a spring washer (11) for blocking the bearing on the shaft (3). The external ring (4) comprises bosses (12) for axially maintaining the spring washer (11).

33 Claims, 9 Drawing Sheets

ROLLING BEARING OF STEERING COLUMN FOR MOTOR VEHICLES

ROLLING BEARING OF A STEERING COLUMN FOR MOTOR VEHICLES

The present invention is in the field of rolling bearings, especially for motor vehicle steering columns.

Steering columns generally comprise a shaft, one end of which is secured to a steering wheel acted upon by the driver of the vehicle, and the other end of which is secured to mechanical components intended to angularly position the wheels of the vehicle. The steering column shaft is mounted in a stationary tubeshaped housing by means of two rolling bearings, generally angular contact ball bearings mounted in opposition.

The outer rings of the rolling bearings are secured to the steering column housing and the inner rings are mounted on the column shaft via a ring known as a tolerance ring.

The assembly runs with zero clearance by virtue of an axial preload exerted on the tolerance rings by an axially elastic member which may, for example, be a spring, a spring washer, etc.

In general, the axial preload is exerted on the tolerance ring of just one of the two rolling bearings, the tolerance ring of the second rolling bearing being axially immobilized in the direction of this preload. As the tolerance ring of the first rolling bearing can slide axially along the shaft, the axial force exerted by the axially elastic member tends to move the inner rings of the two rolling bearings axially closer together.

Internal play in the rolling bearings is thus take up and preloaded clearance-free continuous contact between the rings and the rolling elements of the rolling bearing is ensured.

Document U.S. Pat. No. 5,193,917 (INA) discloses a rolling bearing for a steering column, in which the axially elastic member consists of a part made of plastic which can be made as a single piece with the tolerance ring. The main drawbacks of this rolling bearing lie in the relatively complex shape of this plastic part and in the difficulty in guaranteeing, in the long-term, control over the amount of preload, bearing in mind the aging of the plastic.

Other known rolling bearings for steering columns comprise an additional part in the form of a locking washer for positioning the tolerance ring on the steering column shaft.

These rolling bearings therefore generally comprise an outer ring that is secured to the housing, an inner ring that is in contact with the shaft, a row of rolling elements arranged between the two rings and Ain contact with them, an tolerance ring, generally made of polyamide, which provides the connection between the inner ring and the steering column shaft and is capable of transmitting axial loads to the inner ring in order to keep the rolling bearing under continuous internal preload, and a locking washer which serves to close the rolling bearing assembly and lock it axially on the shaft while at the same time maintaining an axial preload on the tolerance ring so as to achieve playfree running of the rolling bearing.

In the conventional way, the various parts of such a rolling bearing are not joined together until they are mounted in the steering column device. There is therefore a risk that elements will become mislaid during handling and during the mounting of the assembly in the steering column device. Furthermore, it is necessary to perform stock control on numerous different parts.

For these various reasons the search has been on to produce a non-disassemblable assembly comprising the rings, the rolling elements, the tolerance ring and the locking washer so that said assembly can be assembled before it is mounted in the steering column device and thus deliver rolling bearings that are ready to be mounted without the risk of parts being mislaid.

Document DE-A 38 08 556 (FAG) discloses a steering column rolling bearing in which the tolerance ring made of synthetic material comprises a portion arranged radially between the inner ring and the shaft, and which is extended axially on one side, toward a cylindrical end of the outer ring, this axial extension having radial protrusions intended to axially retain the outer ring. The tolerance ring also comprises a cylindrical portion arranged axially on the opposite side to the aforementioned portion, and radially between the outer ring and a locking washer system, the free end of this cylindrical portion also having radial protrusions for axially retaining the locking washer. However, a tolerance ring of this type protrudes radially inwards with respect to the bore of the inner ring, which increases the radial bulk of the rolling bearing and protrudes axially beyond the radial end of the outer ring, which increases the axial bulk of the rolling bearing.

The object of the present invention is to overcome these drawbacks and to use a tolerance ring of simple shape.

Another object of the invention is to provide a rolling bearing which forms a very compact non-disassemblable assembly which can be mounted in the steering column device in a single operation.

A further object of the invention is to provide a rolling bearing which forms a compact non-disassemblable assembly incorporating axially elastic means for exerting a radial preload allowing the assembly comprising the two rolling bearings mounted one at each end of the housing of a steering column to run without play.

The rolling bearing according to the invention is in particular intended for a motor vehicle steering column, and is of the type comprising an outer ring equipped with a raceway, an inner ring equipped with a raceway, a row of rolling elements arranged between the raceways of said rings, a tolerance ring providing the connection between the inner ring and the steering column shaft, and a locking washer for locking the bearing axially on the shaft. The outer ring comprises a means of axially retaining the locking washer.

Thus, at least when the bearing is mounted on the shaft, the tolerance ring need not project either inward with respect to the bore of the inner ring or axially beyond the outer ring. In this case, the dimensions of the two rings essentially define the overall dimensions of the rolling bearing.

In one embodiment of the invention, the outer ring comprises a cylindrical portion surrounding the tolerance ring and the locking washer, and provided with a radial deformation, said radial deformation being capable of cooperating with the periphery of the locking washer, thus axially retaining it. The radial deformation may be arranged at the free end of the outer ring and may form a narrowing. It is very simple and economical to produce such a narrowing.

In one embodiment of the invention, the radial deformation comprises a number of bosses projecting inward with respect to the bore of the cylindrical portion of the outer ring.

In another embodiment of the invention, the radial deformation comprises an annular bulge projecting inward with respect to the bore of the cylindrical portion of the outer ring.

In another embodiment, the deformation comprises a number of tabs projecting with respect to the bore of the cylindrical portion of the outer ring.

In another embodiment of the invention, the deformation comprises an annular slot provided in the bore of the cylindrical portion of the outer ring.

In one embodiment of the invention, the locking washer comprises a cylindrical portion arranged radially between the tolerance ring and the retaining means of the outer ring, said cylindrical portion being extended at its free end by a radial flange facing outward and capable of cooperating with the retaining means.

In another embodiment of the invention, the locking washer is substantially radial near this periphery.

The locking washer may be cut into tabs on its periphery.

In order that the means for exerting an axial preload can also be integrated into the rolling bearing, an axially elastic washer may be inserted axially between the tolerance ring and the locking washer.

In an alternative form, the locking washer is shaped with means that have axial elasticity so that it itself exerts an axial preload on the tolerance ring.

In this case, the locking washer may preferably comprise a radial portion in which there are flexible elastic tabs projecting axially from said radial portion toward the tolerance ring.

Said elastic tabs may preferably face in the circumferential direction.

By virtue of the invention, a rolling bearing is obtained in which the tolerance ring is of a simple shape, the overall dimensions of which are small and which can be assembled in a non-disassemblable manner prior to delivery to a customer who will then mount it in a steering column.

BRIEF DESCRIPTION OF THE DRAWINGS

The invention will be better understood from studying the detailed description of a few embodiments taken by way of entirely nonlimiting examples and illustrated by the appended drawings, in which.

DESCRIPTION OF THE PREFERRED EMBODIMENTS

Figure 1:
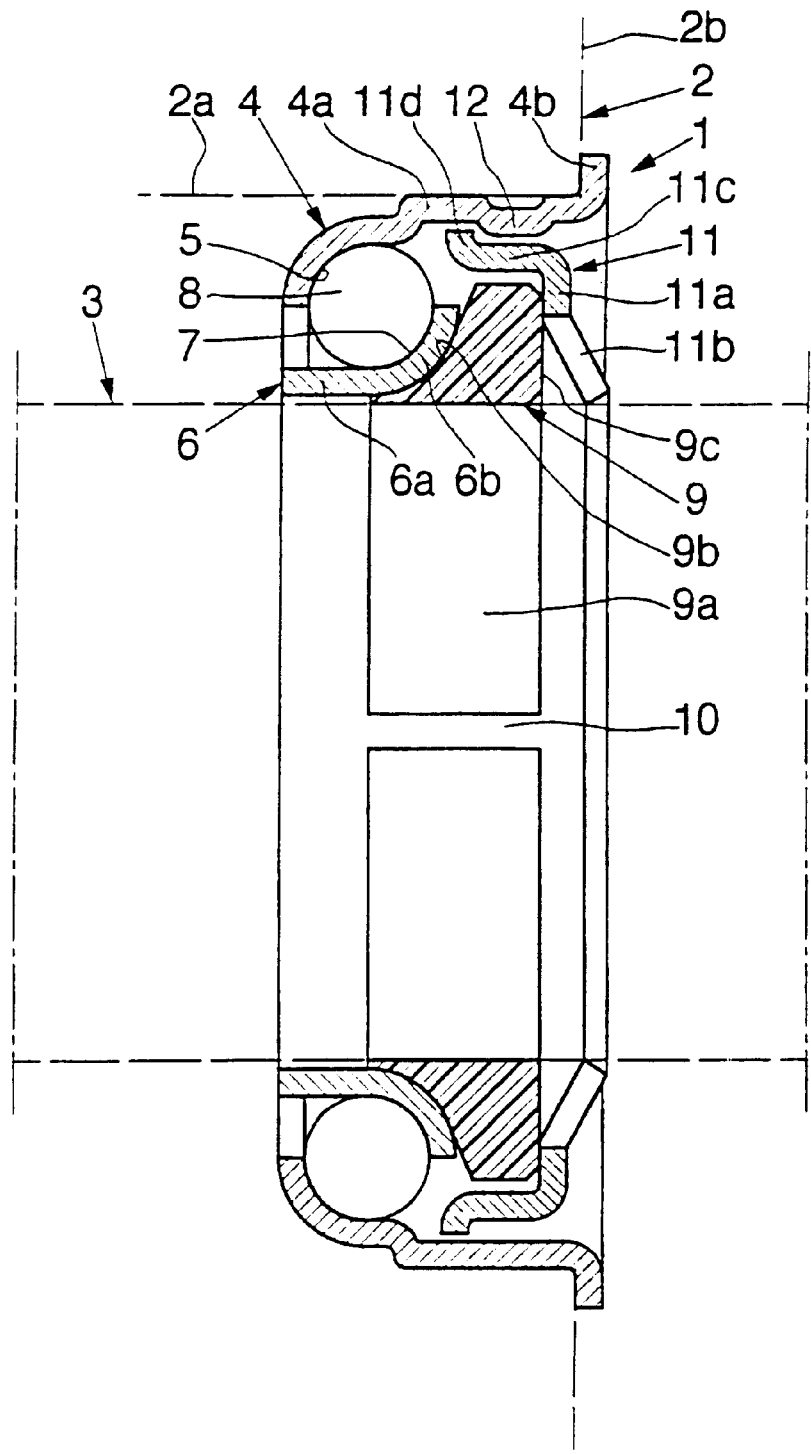
FIG. 1 is a view in axial section of a rolling bearing according to a first embodiment of the invention.

As can be seen in FIG. 1, the rolling bearing 1 is arranged between a stationary housing 2 depicted in chain line and comprising a bore 2a and a frontal surface 2b, and a rotating shaft 3 also depicted in chain line.

The rolling bearing 1 comprises an outer ring 4 made of pressed sheet metal, defining a raceway 5, an inner ring 6 made of pressed sheet metal defining a raceway 7, and a row of rolling elements 8, for example balls, arranged between the internal raceway 5 of the outer ring 4 and the external raceway 7 of the inner ring 6.

The outer ring 4 comprises a cylindrical portion 4a extending from the row of rolling elements 8 toward the frontal surface 2b of the housing 2 and a radial flange 4b extending from the free end of the cylindrical portion 4a outward. The cylindrical portion 4a is in contact with the bore 2a of the housing 2 and the radial flange 4b is in contact with the frontal surface 2b of the housing 2 and serves as an axial positioning stop. The inner ring 6 comprises a cylindrical portion 6a push fitted onto the shaft 3 with a certain radial clearance and a toroidal portion 6b, the external surface of which forms the raceway 7.

The rolling bearing 1 comprises an elastic tolerance ring 9 made of synthetic material, for example polyamide, and forming a ring shape broken by a radial slit 10. The radial slit 10 allows the tolerance ring 9 to adapt to dimensional variations in the diameter of the shaft 3 and the inner ring 6, these being due to manufacturing tolerances, and thus by elasticity provide a connection between the inner ring 6 and the shaft 3. The tolerance ring 9 also makes it possible to compensate for defects in concentricity of the housing with respect to the shaft. The tolerance ring 9 comprises a bore 9a in contact with the shaft 3, a toroidal surface portion 9b of a shape that corresponds to the toroidal portion 6b of the inner ring 6 and is in contact with it, and on the opposite side to the toroidal surface 9b, a radial surface 9c.

The rolling bearing 1 also comprises a locking washer 11 comprising a radial portion 11a in contact with the radial surface 9a of the tolerance ring, an oblique flange 11b extending from the radial portion 11a radially inward and axially away from the tolerance ring 9, a cylindrical portion 11c extending from the periphery of the radial portion 11a and arranged radially between the cylindrical portion 4a of the outer ring 4 and the tolerance ring 9, and a radial flange 11d which is continuous and extends from the free end of the cylindrical portion 11c toward the cylindrical portion 4a of the outer ring 4.

The oblique flange 11b, which may be cut into tabs, grips onto the shaft 3 and this allows the locking washer 11 to be shifted toward the rolling elements 8 by sliding along the shaft 3, but prevents axial movement in the opposite direction as the radial flange 11b becomes braced against the shaft 3. It is therefore possible, on mounting, to arrange the locking washer 11 in a predetermined axial position on the shaft 3 so as to apply axial preload to the inner ring 6 via the tolerance ring 9. The toroidal surface 9b of the tolerance ring 9 in contact with the inner ring 6 produces a wedging effect between the shaft 3 and the toroidal portion 6b of the inner ring 6 and this provides a satisfactory connection between the shaft 3 and the inner ring 6 and also prevents any inadvertent radial shifting of the tolerance ring 9 while the rolling bearing is not yet mounted on the shaft.

The cylindrical portion 4a of the outer ring 4 has a number of bosses 12 projecting radially inward with respect to the bore of said cylindrical portion and arranged axially in the region of the cylindrical portion 11c of the locking washer 11. The bosses 12 define a diameter that is smaller than that of the radial flange 11d of the locking washer 11. Thus, before the rolling bearing 1 is mounted in its housing 2 and around the shaft 3, the locking washer 11 cannot become separated from the other elements of the rolling bearing 1 because of the retaining effect exerted by the bosses 12.

The rolling bearing 1 is assembled as follows: the row of rolling elements 8 is placed in the raceway 5 of the outer ring 4, the inner ring 7 is brought into contact with the rolling elements 8, the tolerance ring 9 is brought into contact with the inner ring 6 and the locking washer 11 is then forced axially into the outer ring 4 so that, by elasticity, the radial flange 11d of the locking washer 11 can travel past the bosses 12 and be located axially between said bosses and the row of balls.

The interference between the diameter of the radial flange 11d and the diameter defined by the bosses is calculated to be such that it is possible for the locking washer 11 to be snap-fastened into the outer ring 4 while at the same time guaranteeing that it will be sufficiently impossible for it to be disassembled later. To make mounting easier and to reduce, or even eliminate, the interference during the operation, it is possible to angle the locking washer 11 with respect to the outer ring 4.

Of course, by way of an alternative, and more particularly if there is a desire to make it even more impossible for the locking washer 11 to be disassembled from the outer ring 4, it is possible to form the bosses after the locking washer has been fitted into the outer ring.

It is therefore possible to appreciably increase the interference between the bosses and the periphery of the locking washer. This then yields a rolling bearing 1 which forms a non-disassemblable assembly which can easily be handled.

Figure 2:
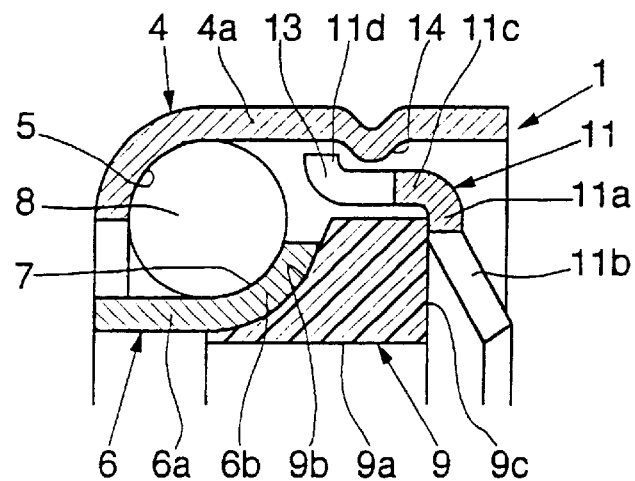
FIG. 2 is a half view in axial section of a rolling bearing according to a second embodiment of the invention.

The embodiment illustrated in FIG. 2 is similar to that of FIG. 1 except that the radial flange 11d and, at least in part, the cylindrical portion 11c of the locking washer 11, are cut into tabs 13. The outer ring 4, devoid of boss and radial flange, has a continuous internal bulge 14 obtained by rolling a roller along the exterior surface of the cylindrical portion 4a. The internal bulge 14 is formed roughly where-the bosses were formed in the previous embodiment and projects radially inward with respect to the bore of the cylindrical portion. As the locking washer 11 comprises the tabs 13, it is possible to form the bulge 14 prior to mounting the rolling bearing 1 and for the locking washer 11 to be the last thing to be mounted, the tabs 13 being capable of retreating inward as they pass over the internal bulge 14. Manufacture of the outer ring 4 and mounting of the rolling bearing 1 are thus very simple and economical.

Figure 3:
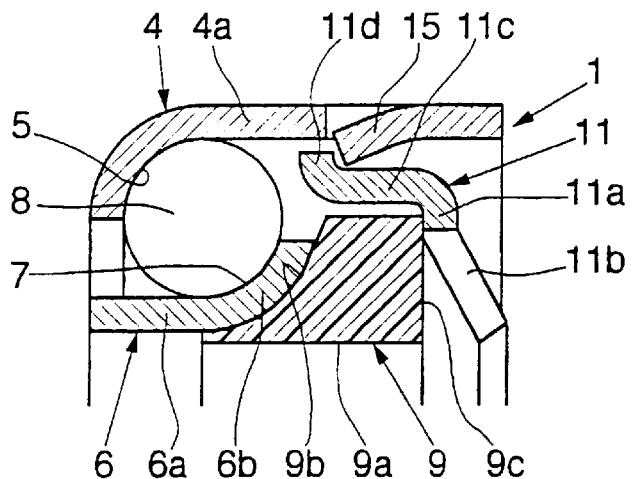
FIG. 3 is a view similar to FIG. 2 showing a rolling bearing according to a third embodiment of the invention.

The embodiment illustrated in FIG. 3 is similar to that of FIG. 1 except that the outer ring 4, devoid of boss and radial flange, comprises a number of tabs 15 formed from the cylindrical portion 4 and projecting radially inward with respect to the bore of said cylindrical part. The tabs 15 are made in the axial direction, their free ends facing toward the radial flange 11d of the locking washer 11 so that the locking washer 11 can snap-fasten in the outer ring 4. The tabs 15 retreat radially outward under the action of the radial flange 11d when mounting the locking washer 11 and thereafter prevent any removal of the locking washer 11, the free end of the tabs 15 defining a diameter that is smaller than that of the radial flange 11d. It is thus possible to form the tabs 15 as early on as the manufacture of the outer ring 4, to assemble all of the parts of the rolling bearing 1, and to fit the locking washer 11 last by virtue of the radial elasticity of the tabs 15 and of the axial retention they exert on the locking washer 11 after assembly.

Figure 4:
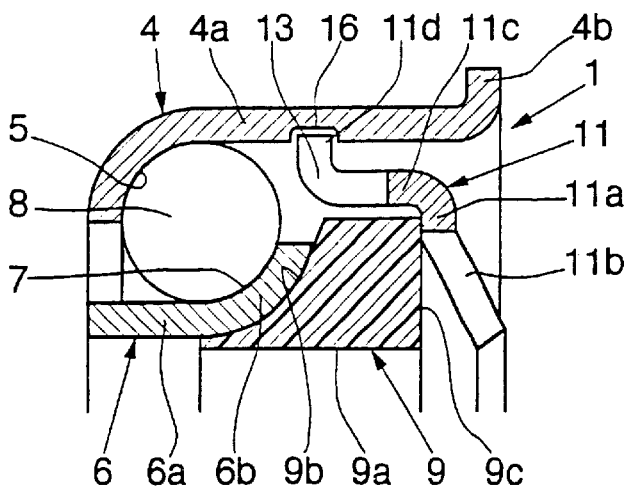
FIG. 4 is a view similar to FIG. 2 showing a rolling bearing according to a fourth embodiment of the invention.

The embodiment illustrated in FIG. 4 is similar to that of FIG. 2 except that the outer ring 4, devoid of internal bulge, comprises an internal circular slot 16 into which the tabs 13 of the locking washer 11 project after mounting. The circular slot 16 can be obtained by machining with the removal of chips or, as a preference, by stamping a flat sheet metal blank intended, after pressing, to form the outer ring 4. When mounting the rolling bearing 1, the locking washer 11 is offered up last of all, in an axial movement. The tabs 13 which have a larger diameter than the bore of the cylindrical portion 4a of the outer ring 4 retreat radially inwards as they pass along said bore and revert to their initial shape in the circular slot 16.

Figure 5:
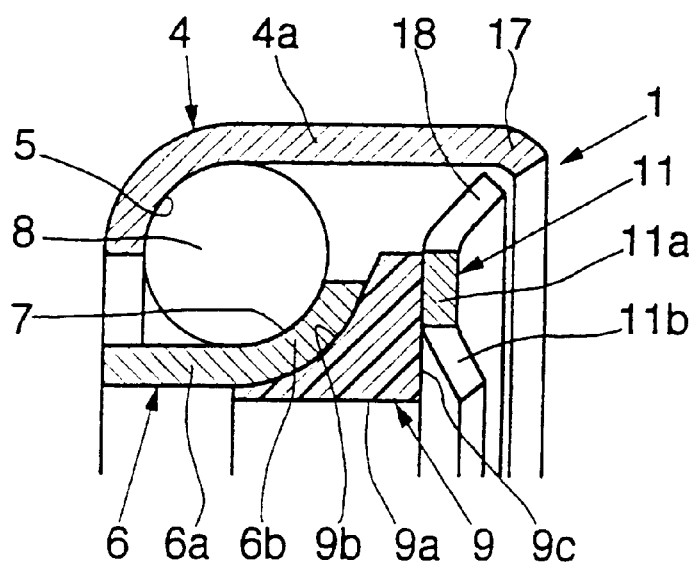
FIG. 5 is a view similar to FIG. 2 showing a rolling bearing according to a fifth embodiment of the invention;.

The embodiment illustrated in FIG. 5 is similar to that of FIG. 1, except that the outer ring 4 devoid of boss and radial flange comprises an oblique narrowing 17 arranged at the free end of the cylindrical portion 4a. The narrowing 17 is formed continuously around the outer ring 4 during the pressing operations intended to form the outer ring 4. The locking washer 11 comprises, starting from the periphery of its radial portion 11a, a row of oblique tabs 18 extending radially outward and inclined away from the rolling elements 8. The locking washer 11 is snap-fastened into the narrowing 17 by virtue of the tabs 18 which are capable of retreating as the narrowing 17 passes and reverting to their initial shape later, thus preventing any disassembly of the locking washer 11 and more generally of the rolling bearing 1, which is particularly compact.

Figure 6:
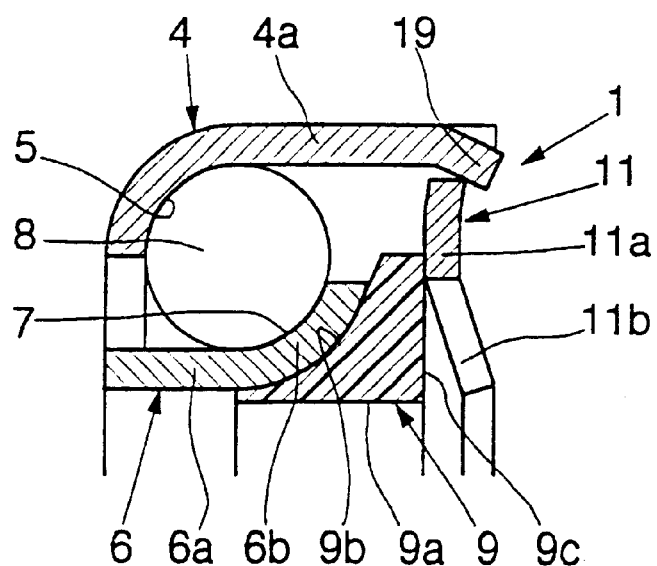
FIG. 6 is a view similar to FIG. 2 showing a rolling bearing according to a sixth embodiment of the invention.

The embodiment of FIG. 6 is similar to that of FIG. 5 except that the outer ring 4 comprises, instead of the narrowing 17, a number of local deformations 19 obtained by a punching operation performed after the locking washer 11 has been mounted. The locking washer 11, devoid of tabs, comprises a radial portion 11a which extends radially near to the bore of the cylindrical portion 4a of the outer ring 4 so that the diameter defined by the local deformations 19 is smaller than the diameter of the periphery of the locking washer 11. First of all, all of the parts that make up the rolling bearing 1 are assembled, then the free end of the cylindrical portion 4a of the outer ring 4 is locally deformed at several points. Such a rolling bearing is extremely axially compact.

Figure 7:
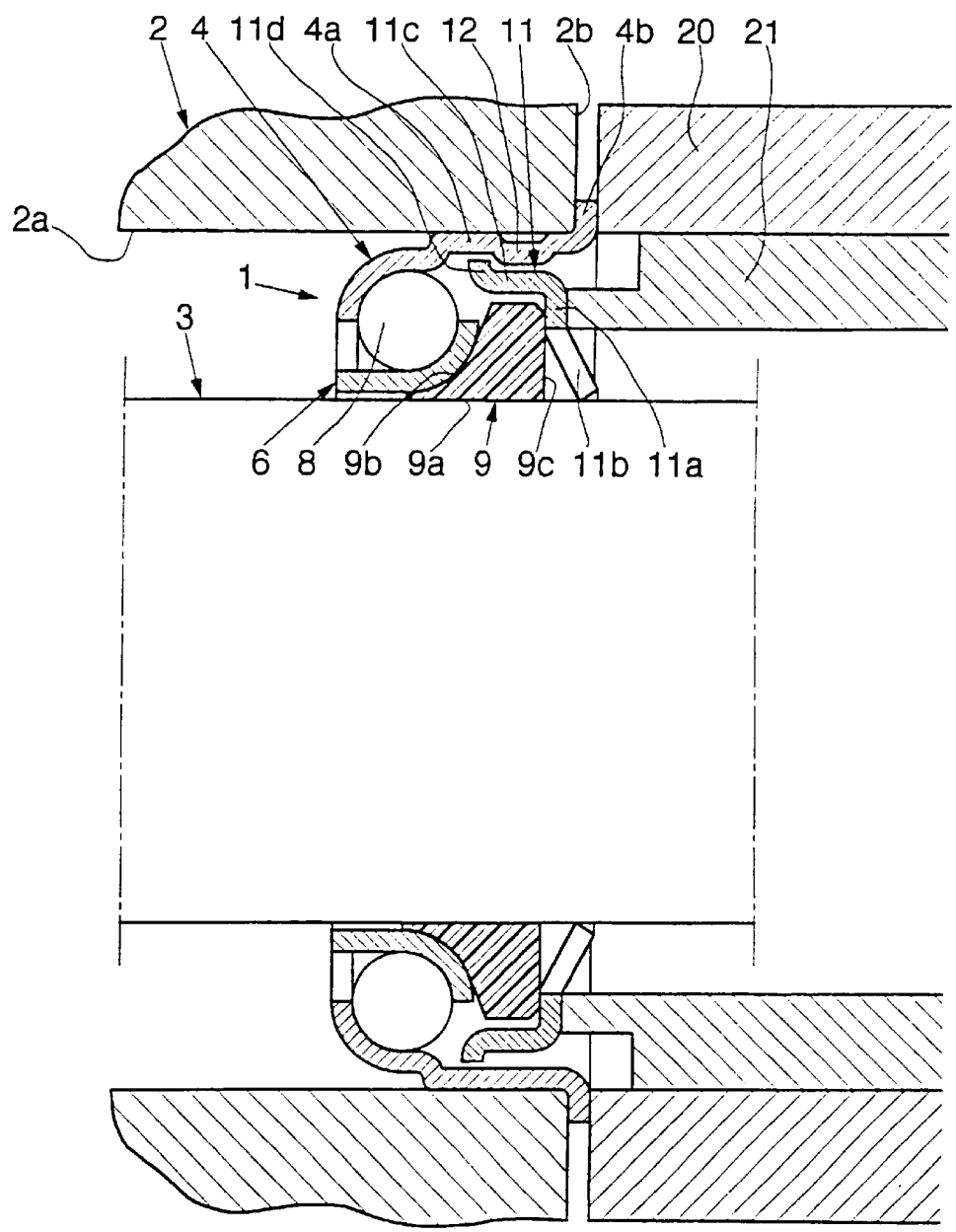
FIG. 7 is a view similar to FIG. 1 showing the mounting of a rolling bearing in its final position.

FIG. 7 illustrates one step in installing the rolling bearing 1 in its final position between the shaft 3 and the housing 2. Installation is performed using a tool comprising an outer sleeve 20 and an inner sleeve 21 which are concentric, the outer sleeve 20 being capable of coming into contact with the radial flange 4b of the outer ring 4 and the inner sleeve 21 being capable of coming into contact with the radial portion 11a of the locking washer 11. First of all, the two sleeves 20 and 21 are shifted simultaneously, the outer sleeve 20 causing the cylindrical portion 4a of the outer ring 4 to be push-fitted into the bore 2a of the housing 2. This push-fitting movement is limited by the radial flange 4b coming into contact with the frontal surface 2b of the housing 2. Next, the inner sleeve 21 is shifted axially toward the rolling elements, 8 to improve the connection between the inner ring 6 and the shaft 3 and to preload the rolling bearing 1. The sleeves 20 and 21 are then withdrawn.

Figure 8:
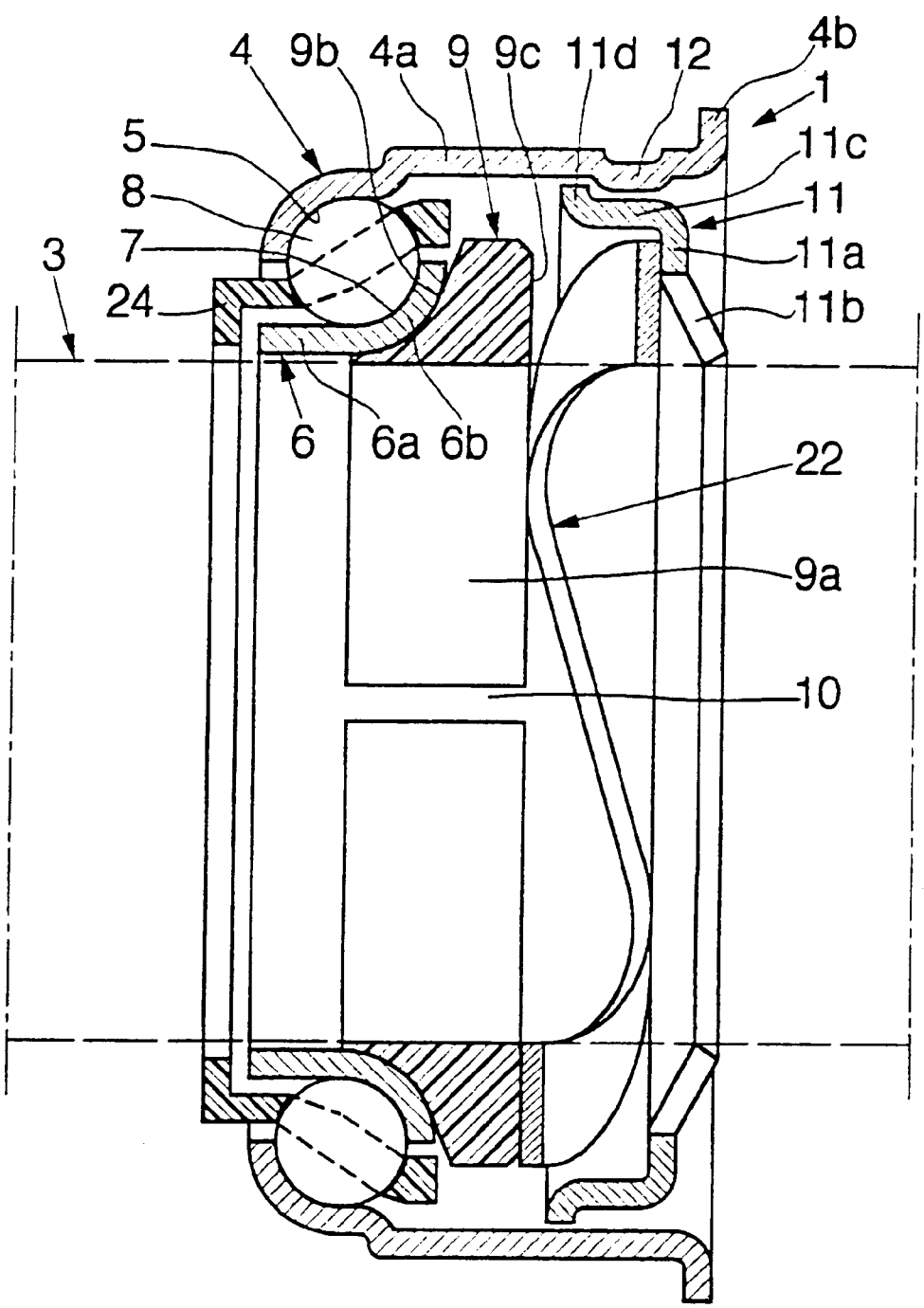
FIG. 8 is a view in axial section of one embodiment of a rolling bearing with a built-in elastic washer.
Figure 9:
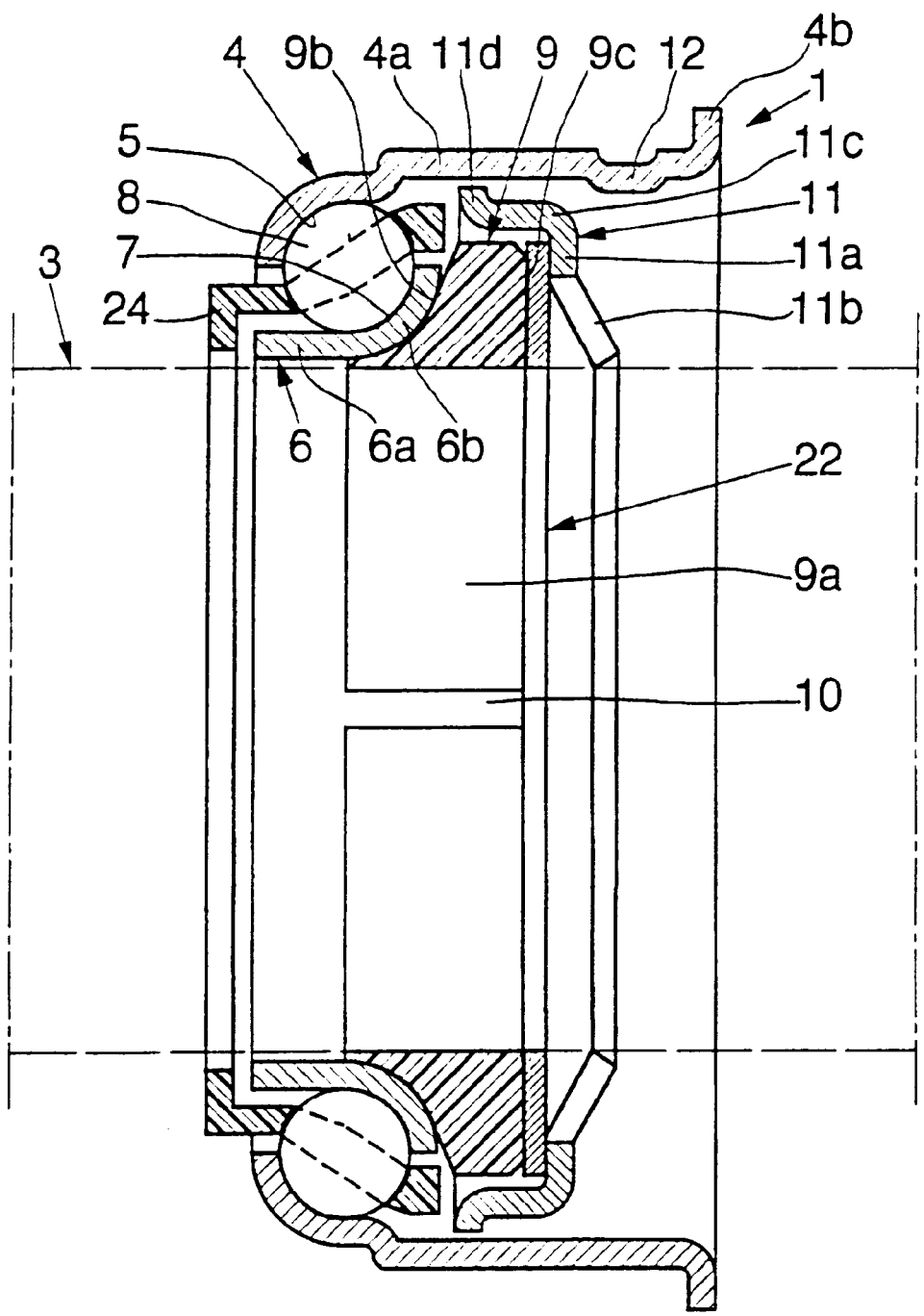
FIG. 9 is a view in axial section of the rolling bearing according to FIG. 8 in the mounted position, with the elastic washer completely compressed.

FIGS. 8 and 9 show a rolling bearing which essentially corresponds to the rolling bearing of FIG. 1, but which additionally incorporates an axially elastic washer 22, here made in the form of a crinkle washer. This spring washer 22 is inserted axially between the tolerance ring 9 and the locking washer 11, bearing against the radial surface 9c of the ring 9 and the radial portion 11a of the locking washer 11.

The inner ring 6, the tolerance ring 9 and the locking washer 11 are identical to those used in the embodiment of FIG. 1, and the outer ring 4 differs from the ring 4 of FIG. 1 only in the increased axial length of the cylindrical portion 4a.

A comparison between FIGS. 8 and 9 makes it possible to see the long elastic travel that the spring washer 22 allows between the position in which the locking washer 11 is furthest back, this position being defined by the radial flange 11d of the locking washer 11 resting against the bosses 12 of the outer ring 4, and the furthest forward position according to FIG. 9, in which the radial portion 11a of the locking washer 11 presses the flattened, fully compressed spring washer 22 against the radial surface 9c of the tolerance ring 9.

Figure 10:
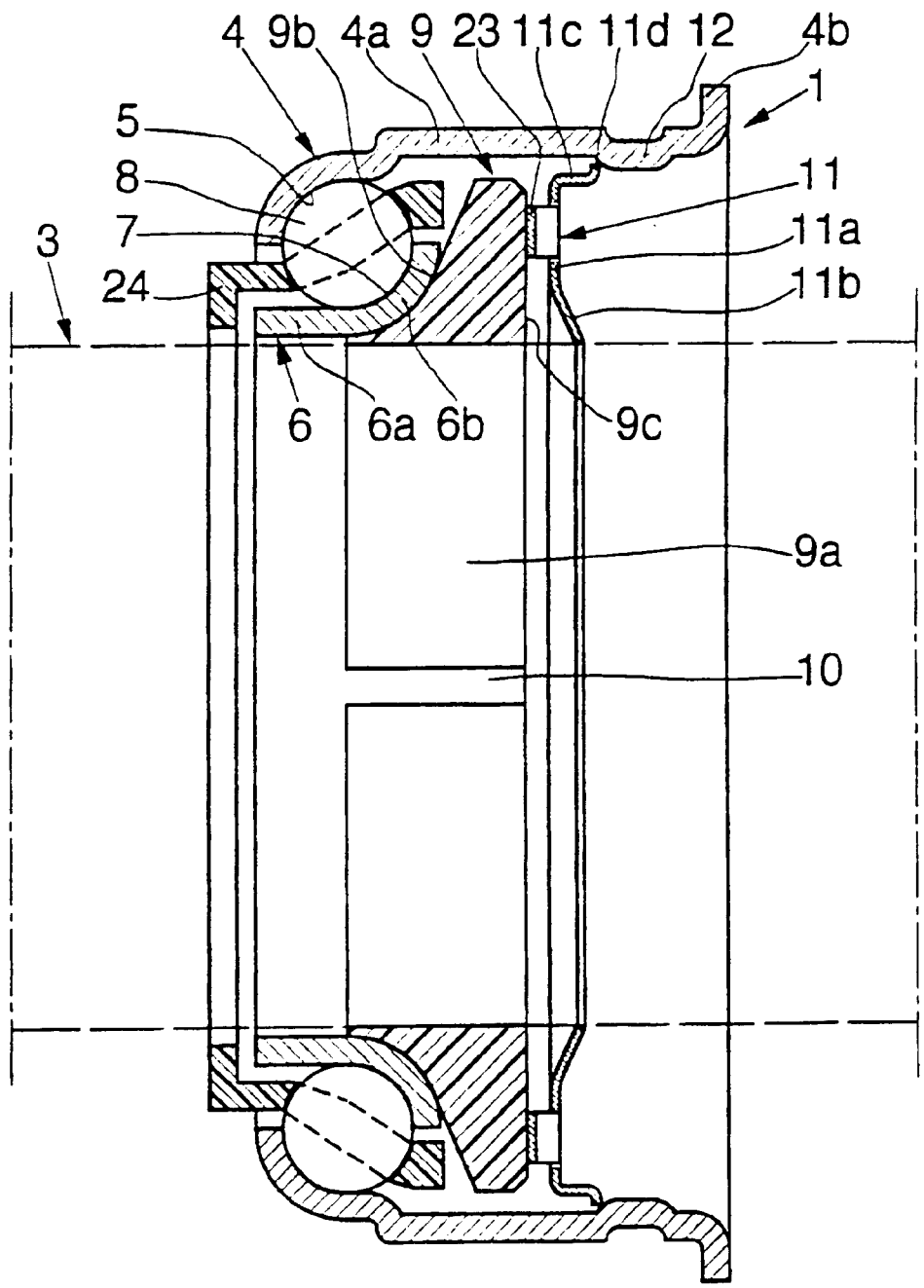
FIG. 10 is a view in axial section of one embodiment of a rolling bearing comprising a locking washer with tabs that have axial elasticity.
Figure 11:
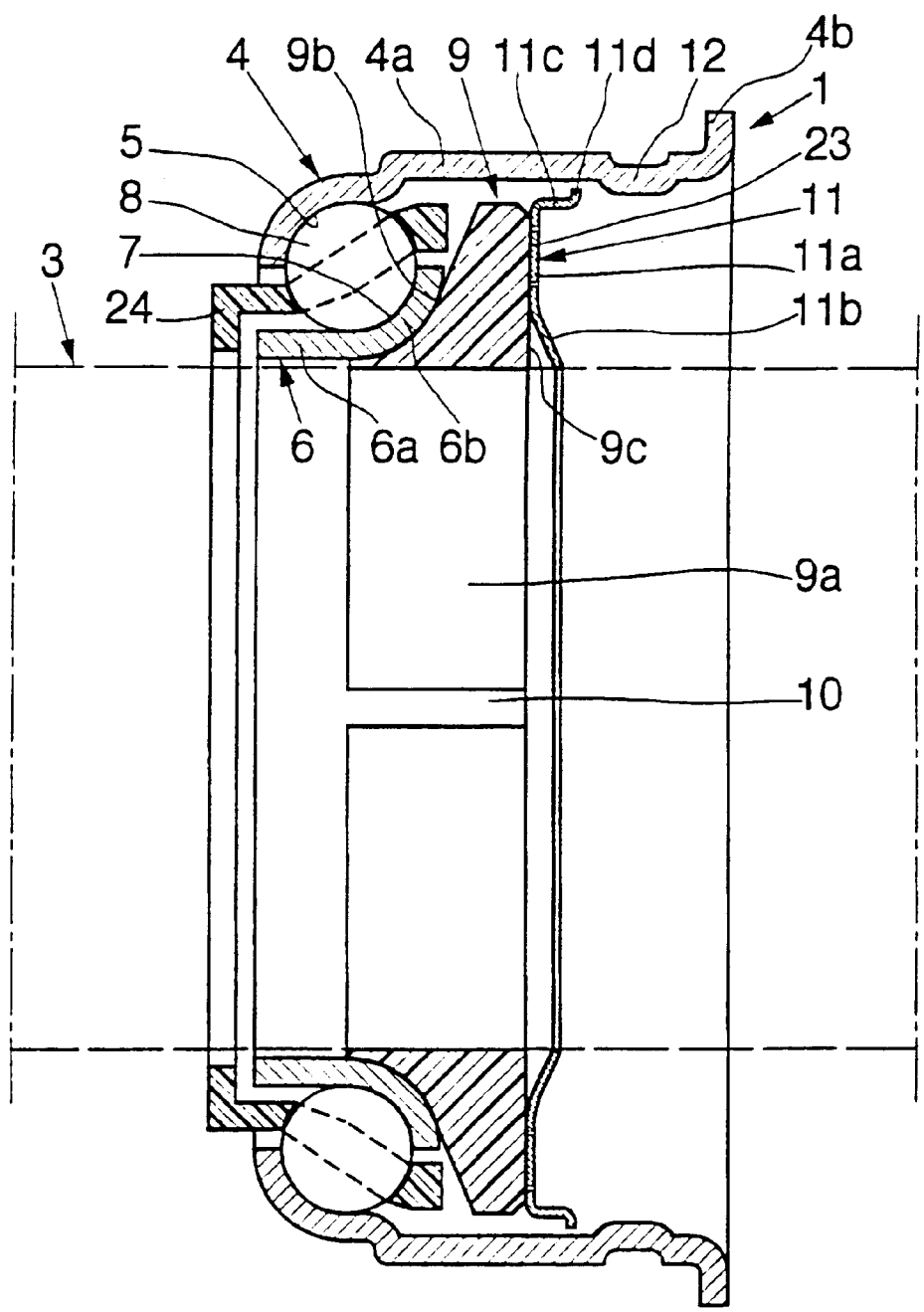
FIG. 11 is a view in section of the rolling bearing according to FIG. 10 in the mounted position, with the elastic tabs of the locking washer fully flexed.

In the rolling bearing according to FIGS. 10 and 11, the means which, through an effect of axial elasticity, provide the axial preload are incorporated into the locking washer 11, the other parts of the rolling bearing (the inner ring 6, the outer ring 4, the tolerance ring 9) being identical to the embodiment of FIGS. 8 and 9.

The locking washer 11 essentially has the same profile as the locking washer 11 of FIG. 1 except that the cylindrical portion 11c extends, from the periphery of the radial portion 11a, toward the free end of the outer ring 4.

Figure 14:
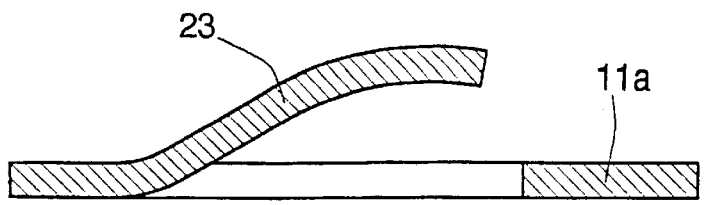

The axial elasticity effect of the locking washer 11 is obtained by the fact that the latter comprises, in its radial portion 11a, a ring of elastic tabs 23 cut in the form of circumferential openings and all curved axially in the same direction, toward the tolerance ring 9, so as to form axially flexible circumferential tabs. As a preference, and as shown in FIG. 14, the tabs 23 are curved in such a way that they have a convex surface in contact with the radial surface 9c of the tolerance ring 9.

Figure 12:
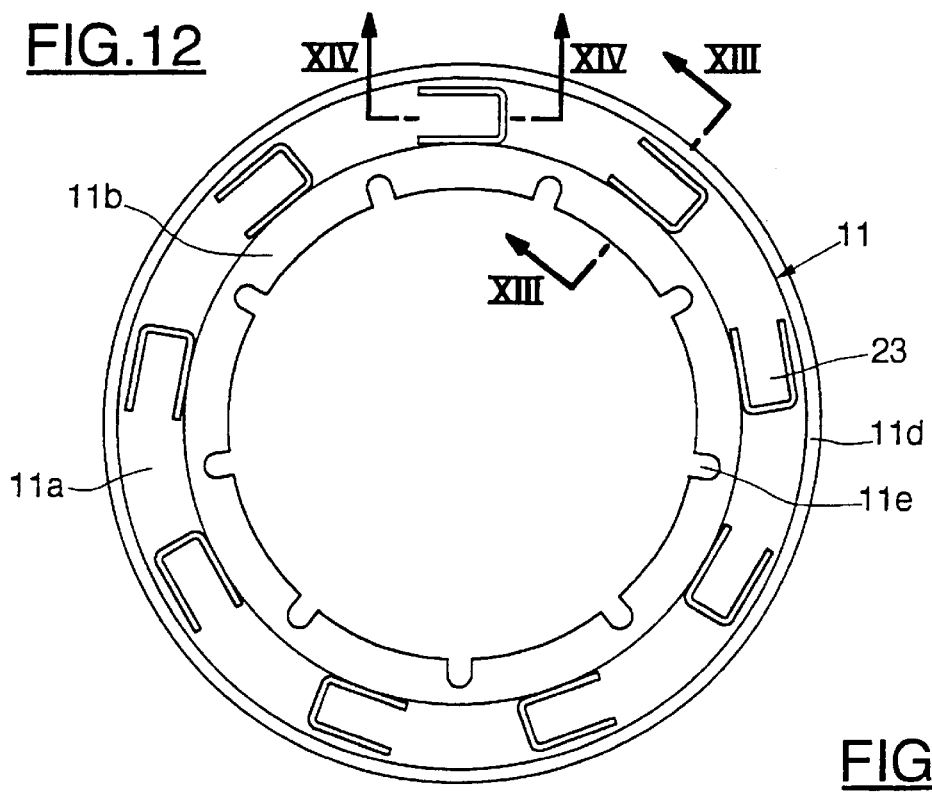
FIG. 12 is an axial view of the locking washer used in the rolling bearing of FIGS. 10 and 11.
Figure 13:
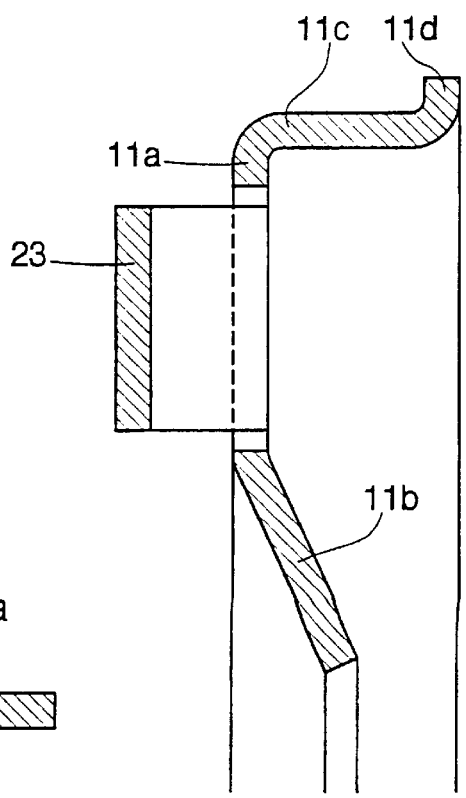
FIGS. 13 and 14 are partial sections on a larger scale on XIII—XIII and XIV—XIV of FIG. 12.

As is particularly visible in FIG. 12, the oblique inner flange 11b of the locking washer 11 is subdivided by notches 11e into a number of catching segments.

Of course, the foregoing embodiments are not in any way limiting and it will be understood that in the embodiment according to FIG. 2 and 5, for example, it would be possible to use a locking washer 11, the periphery of which did not have tabs 13, 18 but was continuous, the outer ring being radially deformed into the form of a bulge 14 or narrowing 17 after the locking washer 11 has been fitted in the outer ring 4.

The cage 24 provided in the embodiments according to FIGS. 8 to 14 for holding the rolling elements 8 at uniform distances apart could also be used in the other embodiments.

To reduce the axial length of the rolling bearing according to FIGS. 10 to 14, it would be possible to give the locking washer 11 the same profile as in FIG. 1, and to shorten the cylindrical portion 4a of the outer ring 4 accordingly.

The tolerance ring 9, in the context of the invention, could also comprise a part engaging under the inner ring 6 so that it is radially inserted between this ring 6 and the shaft 3. Furthermore, this tolerance ring could have a bore smaller than that of the inner ring 6.

Furthermore, the crinkle washer 22 according to FIGS. 8 and 9 could be replaced by a different washer, for example a Belleville-type conical washer or a washer with spring tabs. It would also be possible, in the context of the invention, to replace the circumferential tabs 23 of the locking washer 11 according to FIGS. 10 to 14 with tabs, for example radial tabs, or with other means forming an integral part of the locking washer 11 and allowing an axial preload to be exerted through an elasticity effect.

In any event, by virtue of the invention, a rolling bearing is obtained which is axially and radially compact and which can be handled by an operator before it is finally installed without the risk of mislaying any parts.

What is claimed is:

1. A rolling bearing (1) comprising:
   an outer ring (4) equipped with a raceway;
   an inner ring (6) equipped with a raceway;
   a row of rolling elements (8) arranged between the raceways of said rings;
   a tolerance ring (9) for connecting the inner ring and a shaft; and
   a locking washer (11) for locking the bearing axially on the shaft, and the outer ring comprising means of axially retaining the locking washer.

2. Bearing according to claim 1, characterized in that the locking washer comprises a cylindrical portion arranged radially between the tolerance ring and the retaining means of the outer ring, said cylindrical portion being extended at its free end by a radial flange (11d) that faces outward and is capable of cooperating with said axial retention means.

3. Bearing according to claim 1, characterized in that the locking washer is substantially radial near its periphery.

4. Bearing according to claim 1, characterized in that the periphery of the locking washer is cut into tabs (13).

5. Bearing according to claim 1, characterized in that an axially elastic washer (22) is inserted axially between the tolerance ring (9) and the locking washer (11) to exert axial preload on the tolerance ring.

6. Bearing according to claim 1, characterized in that the locking washer (11) is shaped with means that have axial elasticity so that it itself exerts an axial preload on the tolerance ring (9).

7. Bearing according to claim 6, characterized in that the locking washer (11) comprises a radial portion (11a) in which there are flexible elastic tabs (23) projecting axially from said radial portion toward the tolerance ring.

8. Bearing according to claim 7, characterized in that the elastic tabs (23) are oriented in the circumferential direction.

9. Bearing according to claim 1, characterized in that the outer ring comprises a cylindrical portion surrounding the tolerance ring and the locking washer, and provided with a radial deformation, said radial deformation being capable of cooperating with the periphery of the locking washer.

10. Bearing according to claim 9, characterized in that the radial deformation is arranged at the free end of the outer ring.

11. Bearing according to claim 9, characterized in that the radial deformation comprises a number of bosses (12) projecting inward with respect to the bore of the cylindrical portion of the outer ring.

12. Bearing according to claim 9, characterized in that the radial deformation comprises an annular bulge (14) projecting inward with respect to the bore of the cylindrical portion of the outer ring, to form a narrowing.

13. Bearing according to claim 9, characterized in that the radial deformation comprises a number of tabs (13) projecting inward with respect to the bore of the cylindrical portion of the outer ring.

14. Bearing according to claim 9, characterized in that the radial deformation comprises an annular slot (16) provided on the bore of the cylindrical portion of the outer ring.

15. Bearing according to claim 9, characterized in that the locking washer comprises a cylindrical portion arranged radially between the tolerance ring and the retaining means of the outer ring, said cylindrical portion being extended at its free end by a radial flange that faces outward and is capable of cooperating with said axial retention means.

16. Bearing according to claim 9, characterized in that the locking washer is substantially radial near its periphery.

17. Bearing according to claim 9, characterized in that the periphery of the locking washer is cut into tabs.

18. Bearing according to claim 9, characterized in that an axially elastic washer is inserted axially between the tolerance ring and the locking washer to exert axial preload on the tolerance ring.

19. Bearing according to claim 9, characterized in that the locking washer is shaped with means that have axial elasticity so that it itself exerts an axial preload on the tolerance ring.

20. A rolling bearing for a motor vehicle steering column, comprising:
- an outer ring comprising means of axially retaining a locking washer;
- an inner ring;
- rolling elements arranged between said outer ring and said inner ring; and
- a tolerance ring connecting the inner ring and a shaft of the steering column, wherein said locking washer locks the bearing axially on the shaft.

21. Bearing according to claim 20, characterized in that the outer ring comprises a cylindrical portion surrounding the tolerance ring and the locking washer, and provided with a radial deformation, said radial deformation being capable of cooperating with the periphery of the locking washer.

22. Bearing according to claim 21, characterized in that the radial deformation is arranged at the free end of the outer ring.

23. Bearing according to claim 21, characterized in that the radial deformation comprises a number of bosses projecting inward with respect to the bore of the cylindrical portion of the outer ring.

24. Bearing according to claim 21, characterized in that the radial deformation comprises an annular bulge projecting inward with respect to the bore of the cylindrical portion of the outer ring, to form a narrowing.

25. Bearing according to claim 21, characterized in that the radial deformation comprises a number of tabs projecting inward with respect to the bore of the cylindrical portion of the outer ring.

26. Bearing according to claim 21, characterized in that the radial deformation comprises an annular slot provided on the bore of the cylindrical portion of the outer ring.

27. Bearing according to claim 20, characterized in that the locking washer comprise
- a cylindrical portion arranged radially between the tolerance ring and the retaining means of the outer ring, said cylindrical portion being extended at its free end by a radial flange that faces outboard and is capable of cooperating with said axial retention means.

28. Bearing according to claim 20, characterized in that the locking washer is substantially radial near its periphery.

29. Bearing according to claim 20, characterized in that the periphery of the locking washer is cut into tabs.

30. Bearing according to claim 20, characterized in that an axially elastic washer is inserted axially between the tolerance ring and the locking washer to exert axial preload on the tolerance ring.

31. Bearing according to claim 20, characterized in that the locking washer is shaped with means that have axial elasticity so that it itself exerts an axial preload on the tolerance ring.

32. A steering column assembly comprising:
- a steering column having a shaft located within a bore of a housing; and
- a bearing assembly located between said shaft and said housing, wherein said bearing assembly includes an outer ring comprising means for axially retaining a locking washer, an inner ring, rolling elements arranged between said outer ring and said inner ring, and a tolerance ring connecting the inner ring and said shaft of the steering column, wherein said locking washer locks the bearing axially on said shaft.

33. A steering column assembly as recited in claim 32 characterized in that an axially elastic washer is inserted axially between the tolerance ring and the locking washer to exert axial preload on the tolerance ring.

\* \* \* \* \*